United States Patent [19]

Logsdon

[11] 4,314,687
[45] Feb. 9, 1982

[54] SOUND ISOLATING DEVICE FOR SUSPENDING PLUMBING PIPES

[75] Inventor: Daniel D. Logsdon, Fullerton, Calif.

[73] Assignee: The Logsdon Foundation, Stanton, Calif.

[21] Appl. No.: 148,390

[22] Filed: May 9, 1980

[51] Int. Cl.³ ............................................ F16M 13/00
[52] U.S. Cl. .................................... 248/610; 267/152
[58] Field of Search ............ 248/612, 613, 633, 634, 248/615, 632, 610; 267/151, 152

[56] References Cited

U.S. PATENT DOCUMENTS

| 1,611,906 | 12/1926 | Gurney | 248/612 X |
| 1,718,461 | 6/1929 | Harder et al. | 248/612 |
| 2,914,313 | 11/1959 | Morris | 267/151 |
| 3,544,176 | 12/1970 | Slater | 267/152 X |
| 3,873,077 | 3/1975 | Jorn | 267/152 |

FOREIGN PATENT DOCUMENTS

| 111396 | 9/1940 | Australia | 248/632 |
| 111757 | 10/1940 | Australia | 248/634 |
| 457632 | 5/1944 | Canada | 248/634 |
| 526806 | 9/1940 | United Kingdom | 248/634 |
| 812666 | 4/1959 | United Kingdom | 248/634 |
| 822805 | 11/1959 | United Kingdom | 248/633 |

Primary Examiner—J. Franklin Foss
Attorney, Agent, or Firm—K. H. Boswell; Edward D. O'Brian

[57] ABSTRACT

A device for suspending plumbing components such as a pipe elbow or a high ear 90 elbow between the studs of a wall and retarding propagation of sound between the plumbing components and the wall has a main body or housing formed of a semi-resilient material which is incapable of transmitting a sound from a first location in this body to a second location also in the body. A first member which attaches to the wall or a strip of plumbers tape extending between the studs is attached to the body at the first location. A second member which attaches to the plumbing components is attached to the body at the second location. The first and second members are connected to the body at their respective locations such that a parallel portion of the first member is parallel with, but is not coplanar with, a parallel portion of the second member. The non-coplanar positioning of the portions of the first and second members spaces the attachment of the plumbing component out of the plane of attachment to the support surface or plumbers tape.

12 Claims, 5 Drawing Figures

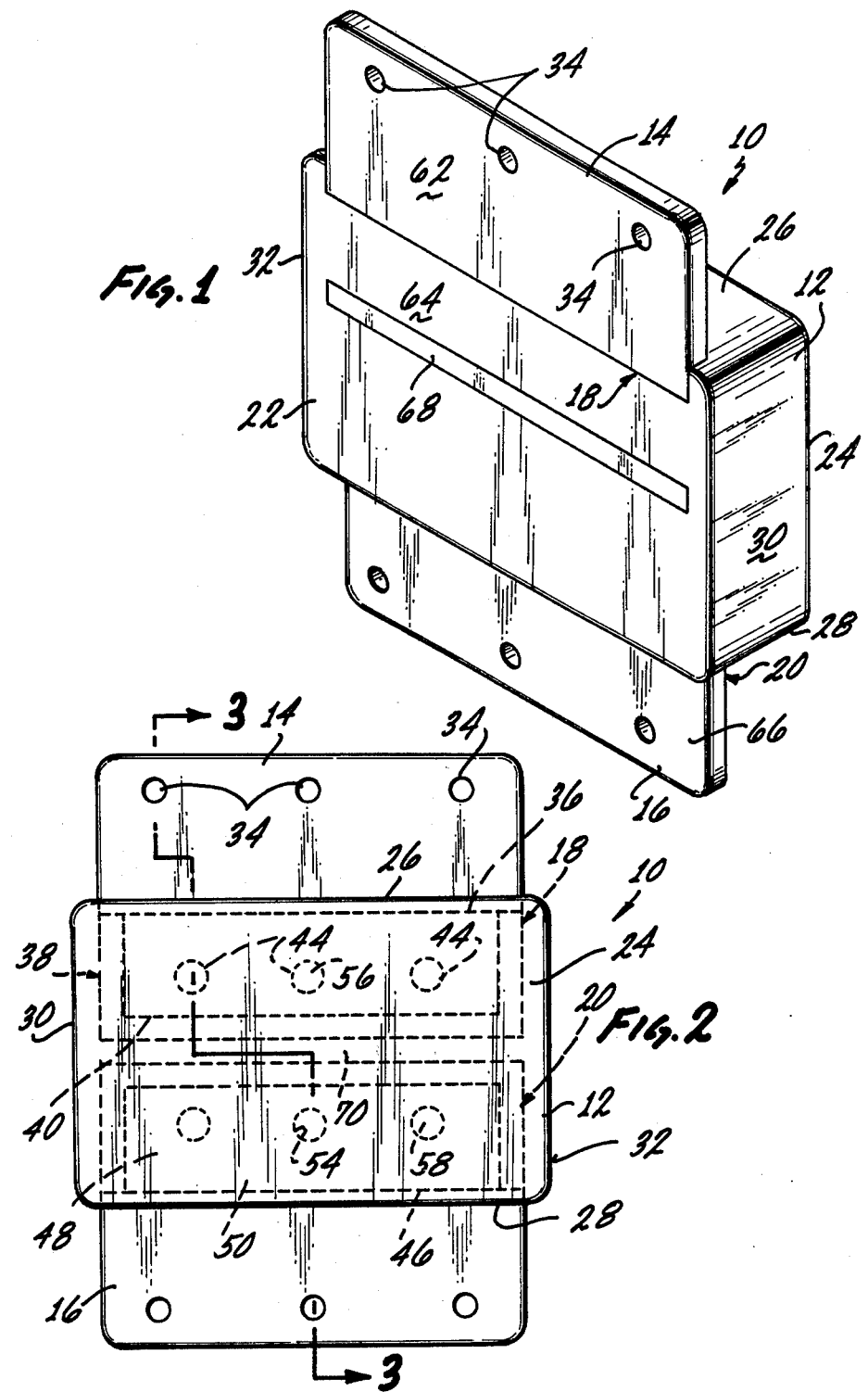

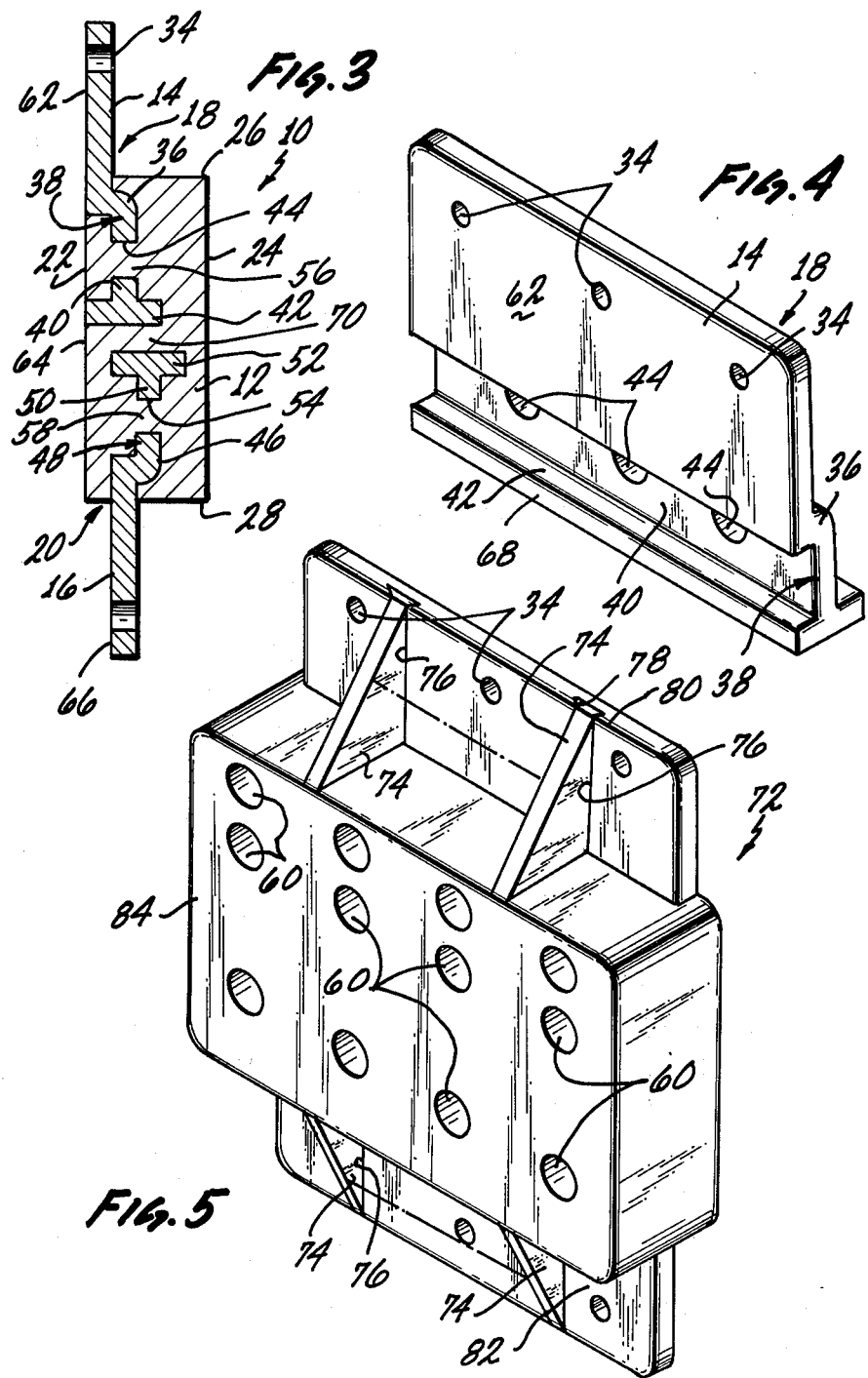

SOUND ISOLATING DEVICE FOR SUSPENDING PLUMBING PIPES

CROSS-REFERENCE TO RELATED APPLICATIONS

This application is related to the subject matter of my application entitled "SOUND INSULATING SUPPORT FOR PLUMBING PIPES", Ser. No. 153,033, filed May 27, 1980, the entire disclosure of which is herein incorporated by reference.

BACKGROUND OF THE INVENTION

This invention is directed to a device which suspends a plumbing component such as a high ear 90 elbow to a support structure in a manner that inhibits sound propagation from a pipe attaching to the elbow to the support structure.

In older methods of plumbing galvanized pipe and the like were exclusively used within a home or other structure as water lines. These pipes were attached to the wall studs and other support members using metal clamps which were nailed or screwed to the stud fixedly holding the pipe to the surface of the stud or other support structure. Noises are created within water pipes for a variety of reasons, including temperature changes within the pipe when the flow of water is interrupted or initiated, and actual movement of the water or of entrapped gases through the pipes. The noises created within the pipes previously were transferred from the pipe to the studs or support structures by the direct contact of the pipe to the stud or support structure noted above.

Fairly recent introduction of copper tubing and plastic pipe has revolutionized certain aspects of the plumbing industry with respect to the use of galvanized pipe. Included as part of the improvements achieved with the use of copper or plastic pipe has been the introduction of certain clamping devices which are not metallic in nature in their entirety and thus have helped to reduce the transfer and propagation of noises within the pipes. The majority of these devices now known incorporate the feature of surrounding the copper tubing or plastic pipe with a plurality of plastic fingers, fins or flanges. The contact between the pipes or tubing and the fingers, fins or flanges does not transfer as much noise as the prior metal to metal contact used in the older plumbing methods. The use of fingers, flanges and fins, however, has not completely resolved the noise propagation problem as is outlined in my patent application entitled "SOUND INSULATING SUPPORT FOR PLUMBING PIPES". That application describes certain clamps and the like which are useful to directly attach pipes or tubing to studs or other support members.

Where a piece of tubing or pipe exits the interior of a wall and then leads directly to a fixture such as a sink, water closet or the like, a unique problem exists in the development of sound isolating devices. The tubing or pipe within the wall runs between the studs parallel to the surfaces of the wall and then it must make a 90 degree bend and project through the wall perpendicular to the wall to feed the sink, water closet or the like. Currently it is the practice with copper tubing to utilize a plumbing fixture called a "high ear 90" elbow at the bend wherein the pipe changes from its parallel position to its perpendicular position with respect to the wall. This high ear 90 elbow is an elbow with a flange attached thereto which is susceptible of being attached to plumbers tape strung between two adjacent studs. Since both the high ear 90 elbow and the plumbers tape are formed of metal, in essence a metal to metal link is established between the stud and the water pipe which serves not only to propagate certain noises within the pipe, but in some instances to amplify this noise.

An alternate procedure utilized to achieve the same function as the high ear 90 elbow is the use of a standard elbow which is fixed to plumbers tape with metallic U-shaped brackets or the like. This results in the same pipe to metal to stud arrangement which results in sound propagation identical to that of the high ear 90 elbow noted above.

BRIEF SUMMARY OF THE INVENTION

In view of the above discussion it is evident that there exists a need in the plumbing industry for a device which is capable of suspending, while concurrently sound isolating, a 90 degree bend in a pipe at the point adjacent to where the pipe exits a wall. Further, because of the multiplicity of said pipes which so exit walls in the typical home, any device for filling the needs of the previous sentence must also be convenient to use by the plumber resulting in economy of labor time and the device itself must be inexpensive, resulting in economy of material. It is an object of this invention to fulfill the need of a device outlined in the preceding.

It is a further object of this invention to provide a device which can be used with a multiplicity of shapes preforming 90 degree bends in pipes such as elbows, or high ear elbows, and additionally can be attached to standard plumbers tape or other structurally supporting materials. It is also an object of this invention to provide a device which will space the connecting surfaces of a plumbing implement such as a high ear 90 elbow away from the inside surface of a wall such that the elbow does not transfer noise to the wall.

These and other objects as will become evident from the remainder of this specification are achieved in a device for suspending a pipe holding component or pipe elbow from a support and retarding sound propagation between said component or elbow and said support which comprises: a first member, at least a portion of which is essentially planar, said planar portion including a support attaching means capable of being utilized in attaching said first member to said support; a second member, at least a portion of which is essentially planar, said planar portion including a component or elbow attaching means capable of being utilized in attaching said component or elbow to said support; a semi-resilient body essentially incapable of transmitting sound from a first location in said body to a second location in said body; connecting means capable of fixedly connecting said first member at said first location in said body and said second member at said second location in said body and locating said first and said second members with respect to one another such that said planar portion of said first member and said planar portion of said second member are essentially parallel with each other but are not coplanar with each other.

Preferredly both the first and second members each include a mounting portion which is formed into a unified structure with the planar portion and the connecting means connects the mounting portion of both the first and second members to the body.

The connecting means can include the body having two cavities. The mounting portions of the first and second members fit within the cavity. Preferredly with the use of cavities the connection means also include both the first and second members including at least one hole traversing through their mounting portions and each of the cavities having a projection which projects across the cavities and is located so as to pass through the holes in the mounting portions of the first and second members.

Preferredly the body is formed of a semi-resilient polymer whose material is capable of being formed about the preformed first and second members to make a unified structure such that the projections passing through the holes in the members are integrally formed with the remainder of the body after polymerization has taken place.

Preferredly the first and second member comprise identical shaped members. The body preferredly is shaped in a rectangular shape having two sets of parallel edges and one set of parallel faces and the planar portion of the first member includes a planar surface which is parallel with and coplanar with one of the faces of the body. The planar portion of the second member includes a planar surface which is displaced rearwardly from the face of the body which is coplanar with the planar portion of the first member toward the other face of the body.

BRIEF DESCRIPTION OF THE DRAWINGS

This invention will be better understood when taken in conjunction with the drawings in which:

FIG. 1 is an isometric view of the device of the invention;

FIG. 2 is a front elevational view of the device shown in FIG. 1;

FIG. 3 is a side elevational view about the line 3—3 of FIG. 2;

FIG. 4 is an isometric view of one of the component parts of the invention shown in FIG. 1 showing this component part isolated from the remainder of the parts; and FIG. 5 is an isometric view of an alternate embodiment of the invention showing the back side of this embodiment with respect to how the invention is shown in FIG. 1.

The invention described in this specification and illustrated in the drawings utilizes certain principles and/or concepts as are set forth in the claims appended to this specification. Those skilled in the plumbing art will realize that these principles and/or concepts could be used in a number of embodiments differing from the embodiment depicted herein without departing from the scope of the claims. For these reasons this invention is to be construed in light of the claims and is not to be construed as being limited to the exact embodiments depicted herein.

DETAILED DESCRIPTION

The suspension device 10 as is seen in FIG. 1 consists of a main rectangular shaped body 12 having two parallel plates—upper plate 14 and lower plate 16—extending from the body 12. Referring to FIG. 3 it can be seen that the upper plate 14 is in fact a planar portion of upper member 18, and likewise the lower plate 16 is a planar portion of a lower member 20, both of which have a portion of their structure located within the interior of the body 12.

The body 12 preferredly is a rectangular box having a front face 22, a rear face 24, top edge 26, bottom edge 28 and side edges 30 and 32 respectively. The body 12 is formed of a thermoplastic rubber in a manner as hereinafter described which allows it to completely surround portions of both the upper and lower members 18 and 20. Being composed of a thermoplastic rubber the body 12 is semi-resilient and thus has the property of inhibiting sound propagation within itself. The body 12 therefore restricts transmittal of sound propagation between anything attached to it at two different locations. As will be more fully explained hereinafter members 18 and 20 are separated or isolated from each other within the interior of the body 12 and thus the body 12 serves to limit sound propagation from one of these members to the other.

The members 18 and 20 are in fact identical in shape and construction and for the purposes of illustrating the preferred form of both of these members 18 and 20, one of them—member 18—is shown in FIG. 4 isolated from body 12. This same figure, however, could also be construed as being illustrative of the other member 20.

The member 18 as noted previously has a plate portion 14. This plate portion 14 is planar, the significance of which will be noted below and includes three holes collectively identified by the numeral 34, which are utilized in attaching the member 18 to a support which will suspend a pipe or pipe elbow during actual use of the suspension device 10. At shoulder 36 the member 18 bends in an S-shape bend. The mounting portion 38 of the member 18 is located on the opposite side of the S-shape bend from the plate portion 14. The mounting portion 38 consists of a second planar plate 40 having a perpendicular flange 42 located on its end. The flange 42 extends to both sides of the plate 40 and thus the flange 42 and the plate 40 when viewed in cross-section have a T-shape. Extending through the plate 40 are a plurality of holes collectively identified by the numeral 44. In the embodiment shown in the figures there are three such holes.

For the purposes of further explaining the invention the lower member 20 has the following parts which are totally equivalent to the corresponding parts in the upper member 18—shoulder 46, mounting portion 48, plate 50, flange 52 and holes 54.

The mounting portions 38 and 40 of the upper and lower members 18 and 20 fit within cavities (not separately numbered) within the body 12. These cavities mimic the shape of the mounting portions 38 and 48 of the members 18 and 20. One of the cavities opens up into edge 26 and the other into edge 28. Formed within the interior of the cavities are projections 46 which pass through holes 44 in upper member 18 and projections 58 which pass through holes 54 in lower member 20. The projections 56 and 58 serve to fixedly hold the members 18 and 20 within the body 12. The flanges 42 and 52 serve in combination with the projections 56 and 58 to also hold the members 18 and 20 within the body 12.

The members 18 and 20 are formed of a suitable thermoplastic material which is rigid such as ABS polymer commonly used in the plumbing industry and acceptable with regard to standardized plumbing codes. Alternately, other material could be used for the members 18 and 20 such as metals including aluminum or steel. The materials for the members 18 and 20 simply must adhere to the requirement that they be rigid enough to either be attached to a supporting surface or have a fixture such as a pipe elbow attached to them.

Once formed the members 18 and 20 are positioned within a mold in an injection molding machine and a suitable semi-resilient material is injected into the mold and allowed to set up or form into the body 12. The exact mechanism in setting up in the body 12 will of course depend upon the materials used for body 12. Thus a thermoplastic rubber material will be injected in a fluid state into the mold and allowed to cool into the body 12. Other materials such as urethane elastomers could be utilized which would be injected into the mold and chemically allowed to polymerize to form the body 12. In any event, the fluid form of the body 12 flows into the mold and around the mounting portions 38 and 48 of the members 18 and 20. Upon setting up, the material for the body 12 forms a unified body around the members 18 and 20 including having the projections 56 and 58 being integrally formed with the rest of the body, but fixedly locking the members 18 and 20 within the body 12. If desired, in order to conserve materials in forming the body 12 cavities 60 can be left in certain surfaces of the body 12 such as within rear face 24 as depicted in the alternate embodiment in FIG. 5. It of course is not necessary to include the cavities 60. They simply result in a conservation of material in those areas where the material is not needed for structural strength or functionality.

During molding of the body 12 the members 18 and 20 are placed within the mold such that in the finished suspension device the plate portion 14 of upper member 18 is parallel with the plate portion 16 of lower member 20 but is not coplanar with it. As is evident from FIG. 3 the plate portion 16 is displaced rearwardly (to the right in the figure) of the plate portion 14 with regard to a vertical plane. The surface 62 of plate portion 14 is coplanar and parallel with the surface 64 of face 22. The surface 66 of plate 16 is depressed away from surface 64 toward face 24. As is evident from FIG. 4 the edge 68 of flange 42 is located in the same plane as the surface 62 and thus in the completed body 10 this edge 68 is exposed in surface 64.

In using the suspension device 10 the upper plate 14 is mounted to a structural support and the lower plate 16 is mounted to a plumbing component such as a high ear 90 elbow. Normally in plumbing for a home and the like, pipes will be run through the spaces between the walls and then make a 90 degree bend to exit perpendicular to the wall and continue on to the fixture with the possibility of having a valve interspaced between the bend and the fixture at the surface of the wall. In any event, it is at the 90 degree bend that the suspension device 10 is utilized. Normally a piece of plumbers tape—i.e., a strip of metal having a series of holes located therein along the length of the tape—is suspended between two adjacent studs and the plate 14 is attached to the plumbers tape using any one of several convenient methods. The surface 66 can be placed against the backside of the tape and a machine screw passed through the tape and then threaded into the holes 34. Alternately, the plate 14 can be conveniently riveted to the plumbers tape using pop rivets or other rivets. Further, nuts and bolts could also be used. In any event, once the plate 14 is fixedly attached to the plumbers tape the suspension device 10 is appropriately suspended from the plumbers tape. The placement of the holes 34 in the plate 14 are such that these holes line up with the holes of the tape.

After the suspension device 10 is so attached to the plumbers tape, a conventional high ear 90 degree elbow is then attached to plate 16 in a likewise manner using screws, rivets or bolts, depending on the preference of the plumber. Normally only a portion of the weight of the pipe coming through the wall will be transmitted to the suspension device 10 because the pipe 10 would also be fixed to either the floor or the roof of the structure. At the point where the pipe goes through the wall on its way toward the fixture a decorative escutcheon is placed around the pipe. It is generally preferred that the pipe not directly contact the wall because of the possibility of sound propagation from the pipe to the wall at this point. Therefore, the suspension device 10 is utilized to maintain the correct alignment of the pipe through the hole in the wall and provide for support to the pipe at this point. While there are not excessive stresses placed on the suspension device 10 there is a limited amount of stress because of its utility in so holding the pipe in place.

The material utilized for the body 12 is selected to be able to absorb the stress noted in the preceding paragraph. The flanges 42 and 52 serve to help transmit any force from lower plate 16 to upper plate 18 via the body 12 evenly through the body 12. It is obvious from inspection of FIG. 3 that these flanges 42 and 52 can serve this force distribution function because of the T-shape in cross-section of the mounting portions 38 and 48.

There is an area 70 of the body 12 located between the flanges 42 and 52 which completely separates the upper and lower members 18 and 20. The area 70 as well as the remainder of the body 12 is strong enough to support the forces it is subjected to. However, because of the nature of the materials it effectively resists propagation of sound transmitted to the lower member 20 from a pipe to the upper member 18 and thus to the suspension surface.

As was noted above, the plane of the plate 14 is not coplanar with the plane of the plate 16. This feature serves to ensure that when the suspension device 10 is used very close to the inside of a drywall, that the high ear elbow or other pipe mounting fixture is displaced away from the inside surface of the same drywall, thus preventing direct contact between this fixture and the drywall. Additionally if the suspension device 10 is in fact directly attached via upper plate 14 to the inside of a supporting wall, as it can be, the displacement of the plate 16 from the plane of the plate 14 insures that the fixture such as the high ear elbow is sufficiently removed from the surface of the supporting structure to negate any contact between said surface and said fixture.

In the alternate embodiment shown in FIG. 5 the suspension device 72 is equivalent to the suspension device 10 as far as all of the components previously illustrated for the suspension device 10. Additionally, the suspension device 72 includes a plurality of buttress members collectively identified by the numeral 74 formed as a part of the body 84 and fitting within a plurality of slots 76 formed within the plate members 80 and 82. The slots 76 have obliquely slanting walls (not numbered) such that the end 78 of the buttress members 74 are firmly locked into the slot 76. This provides for an additional rigidity with respect to flexure of the upper plate 80 with respect to the bottom plate 82 of the suspension device 72. Since the buttress members 74 are formed as a unified structure with the body 84 they also serve to inhibit the propagation of sounds within the suspension device 72.

I claim:

1. A device for suspending a pipe holding component or pipe elbow from a support and retarding sound propagation between said component or elbow and said support which comprises:

a first member, at least a portion of which is essentially planar, said planar portion including a support attaching means capable of being utilized in attaching said first member to said support;

a second member, at least a portion of which is essentially planar, said planar portion including a component or elbow attaching means capable of being utilized in attaching said component or elbow to said support;

a semi-resilient body essentially incapable of transmitting sound from a first location in said body to a second location in said body;

connecting means capable of fixedly connecting said first member at said first location in said body and said second member at said second location in said body and locating said first and second members with respect to one another such that said planar portion of said first member and said planar portion of said second member are essentially parallel with each other but are not coplanar with each other;

said first member includes a mounting portion, said mounting portion and said planar portion forming a unified structure, said connecting means connecting said mounting portion of said first member to said body;

said second member includes a mounting portion, said mounting portion and said planar portion forming a unified structure, said connecting means connecting said mounting portion of said second member to said body;

said connecting means includes said body having a first cavity and a second cavity, said mounting portion of said first member fitting within said first cavity and said mounting portion of said second member fitting with said second cavity.

2. The device of claim 1 wherein:

said connecting means includes said mounting portion of both said first and said second member including at least one hole through said mounting portions;

each of said first and said second cavities including a projection projecting through said cavities and located so as to pass through said holes in said mounting portions of said first and said second members when said first and said second members are located in said cavities.

3. The device of claim 2 wherein:

said semi-resilient body is formed of a semi-resilient polymer and said projections and said body form a unified structure.

4. The device of claim 3 wherein:

said body has at least one planar surface, said planar surface of said body being parallel and coplanar with the surface of said planar portion of said first member and being parallel but not coplanar with a surface of said parallel portion of said second member, and the surface of said parallel portion of said second member being positioned rearwardly with respect to said planar surface of said body.

5. The device of claim 4 wherein:

each of said first and second members comprise identically shaped members having a planar portion which is located external said body and a mounting portion which is located internal said body after said semi-resilient material comprising said body is formed about said first and second members;

said mounting portion includes a plate portion wherein said hole is located and a flange portion oriented perpendicular to said plate portion.

6. The device of claim 1 wherein:

said body includes at least one set of parallel edges and said first cavity is located within said body such that a portion of said first cavity opens up on a first of said edges of said set and said second cavity is located in said body such that a portion of said second cavity opens up on the other of said edges of said set and said planar portion of said first member extends from said body from said first of said edges of said set and said planar portion of said second member extends away from said body from said other of said edges of said set.

7. The device of claim 6 wherein:

said body has at least one planar surface, said planar surface of said body being parallel and coplanar with the surface of said planar portion of said first member and being parallel but not coplanar with the surface of said parallel portion of said second member, and the surface of said parallel portion of said second member being positioned rearwardly with respect to said planar surface of said body.

8. The device of claim 7 wherein:

said planar surface of said first member is essentially continuous with said planar surface of said body.

9. A device for suspending a pipe holding component or pipe elbow from a support and retarding sound propagation between said component or elbow and said support which comprises:

a first member, at least a portion of which is essentially planar, said planar portion including a support attaching means capable of being utilized in attaching said first member to said support;

a second member, at least a portion of which is essentially planar, said planar portion including a component or elbow attaching means capable of being utilized in attaching said component or elbow to said support;

a semi-resilient body essentially incapable of transmitting sound from a first location in said body to a second location in said body;

connecting means capable of fixedly connecting said first member at said first location in said body and said second member at said second location in said body and locating said first and second members with respect to one another such that said planar portion of said first member and said planar portion of said second member are essentially parallel with each other but are not coplanar with each other;

said first member includes a mounting portion, said mounting portion and said planar portion forming a unified structure, said connecting means connecting said mounting portion of said first member to said body;

said second member includes a mounting portion, said mounting portion and said planar portion forming a unified structure, said connecting means connecting said mounting portion of said second member to said body;

said connecting means includes said body having a first cavity and a second cavity, said mounting portion of said first member fitting within said first cavity and said mounting portion of said second member fitting within said second cavity;

said connecting means includes said mounting portion of both said first and said second member including at least one hole through said mounting portions;

each of said first and said second cavities including a projection projecting through said cavities and located so as to pass through said holes in said mounting portions of said first and said second members when said first and said second members are located in said cavities;

said semi-resilient body is formed of a semi-resilient polymer and said projection and said body form a unified structure;

said body has at least one planar surface, said planar surface of said body being parallel and coplanar with the surface of said planar portion of said first member and being parallel but not coplanar with a surface of said parallel portion of said second member, and the surface of said parallel portion of said second member being positioned rearwardly with respect to said planar surface of said body;

each of said first and second members comprise identically shaped members having a planar portion which is located external said body and a mounting portion which is located internal said body after said semi-resilient material comprising said body is formed about said first and second members;

said mounting portion includes a plate portion wherein said hole is located and a flange portion oriented perpendicular to said plate portion;

said body is shaped essentially in a rectangular shape having parallel faces and two sets of parallel edges and said first cavity is located within said body such that a portion of said first cavity opens up on a first edge of said rectangular shape and said second cavity is located in said body such that a portion of said second cavity opens up on a second edge of said rectangular shape which is parallel with said first edge such that said planar portion of said first member extends from said body from said first edge and said planar portion of said second member extends away from said body from said second edge, and said planar surface of said body comprises one of the faces of said rectangular shape, said surface of said planar portion of said first member being essentially continuous with said planar surface of said body and said surface of said planar portion of said second member spaced rearwardly from said one of said faces of said rectangular shape toward the other of said faces of said rectangular shape.

10. The device of claim 9 wherein:
said support attaching means comprise at least one hole located in said planar portion of said first member and said component or elbow attaching means comprises at least one hole located in said planar portion of said second member.

11. The device of claim 10 wherein:
said support attaching means comprises a plurality of holes located in the planar portion of said first member and lying on a line which is parallel to said first edge of said rectangular shape;
said component or elbow attaching means comprises a plurality of holes in said planar portion of said second member and lying on a line which is parallel to said second edge of said rectangular shape.

12. The device of claim 11 including:
a plurality of buttress members integrally formed with said body and extending between said body and the planar portion of both said first and said second members and including fastening means holding said buttress members to said first and second members.

* * * * *